US009133873B2

(12) United States Patent
Bleus et al.

(10) Patent No.: US 9,133,873 B2
(45) Date of Patent: Sep. 15, 2015

(54) ENGAGEMENT MEMBER WITH FASTENING PIN AND METHOD FOR INTERCONNECTING TWO COMPONENTS

(75) Inventors: Heidi Bleus, Genk (BE); Ruth VanDoren, Sint-Joris Winge (BE); Danny Thijs, Zonhoven (BE)

(73) Assignee: Tyco Electronics Nederland BV (BE)

( * ) Notice: Subject to any disclaimer, the term of this patent is extended or adjusted under 35 U.S.C. 154(b) by 890 days.

(21) Appl. No.: 13/149,337

(22) Filed: May 31, 2011

(65) Prior Publication Data

US 2011/0289755 A1    Dec. 1, 2011

(30) Foreign Application Priority Data

Jun. 1, 2010    (EP) .................................... 10075236

(51) Int. Cl.
*F16B 37/04*    (2006.01)
*F16B 19/00*    (2006.01)

(52) U.S. Cl.
CPC ................ *F16B 37/045* (2013.01); *F16B 19/00* (2013.01); *Y10T 29/49826* (2015.01)

(58) Field of Classification Search
CPC .......... F16B 19/00; F16B 19/02; F16B 19/09; F16B 21/02; F16B 21/04; F16B 21/10; F16B 21/12; F16B 21/125; F16B 21/16; F16B 5/0621; F16B 5/0664; F16B 17/00; B21J 15/04; B21J 15/041
USPC ....................... 29/443, 444, 450, 451, 525.03, 29/243.519, 243.526, 243.527, 243.528, 29/243.529, 243.56, 278, 280, 282; 411/27, 28, 49, 50, 44, 45, 54, 54.1
See application file for complete search history.

(56) References Cited

U.S. PATENT DOCUMENTS

| 3,621,751 | A  | * | 11/1971 | Fiorentino ..................... 411/508 |
|---|---|---|---|---|
| 4,652,192 | A  | * | 3/1987  | Schaller .......................... 411/24 |
| 5,833,417 | A  | * | 11/1998 | Sargent et al. .................. 411/85 |
| 6,955,515 | B2 | * | 10/2005 | Barina et al. .................. 411/508 |
| 8,221,041 | B2 | * | 7/2012  | Hauser .......................... 411/349 |
| 2002/0048495 | A1 | * | 4/2002 | Anderson et al. ............. 410/104 |
| 2008/0031703 | A1 | * | 2/2008 | Nakajima ..................... 411/363 |

FOREIGN PATENT DOCUMENTS

DE           29810981  U1    2/1999

OTHER PUBLICATIONS

European Search Report issued by the European Patent Office, dated Nov. 15, 2010, for European Application No. EP 10075236; 6 pages.

* cited by examiner

*Primary Examiner* — Christopher M Koehler
(74) *Attorney, Agent, or Firm* — Merchant & Gould P.C

(57) ABSTRACT

The invention relates to an engagement member that is adapted to be fixed in a groove of a component and to a method for interconnecting two components via an engagement member. In order to provide an engagement member and a method, which provide for an easy assembly of the engagement member in the groove, while still providing sufficient forces for interconnecting the two components, the invention provides that the engagement member comprises a fastening pin that can be pushed into a cavity of one of the two components.

9 Claims, 6 Drawing Sheets

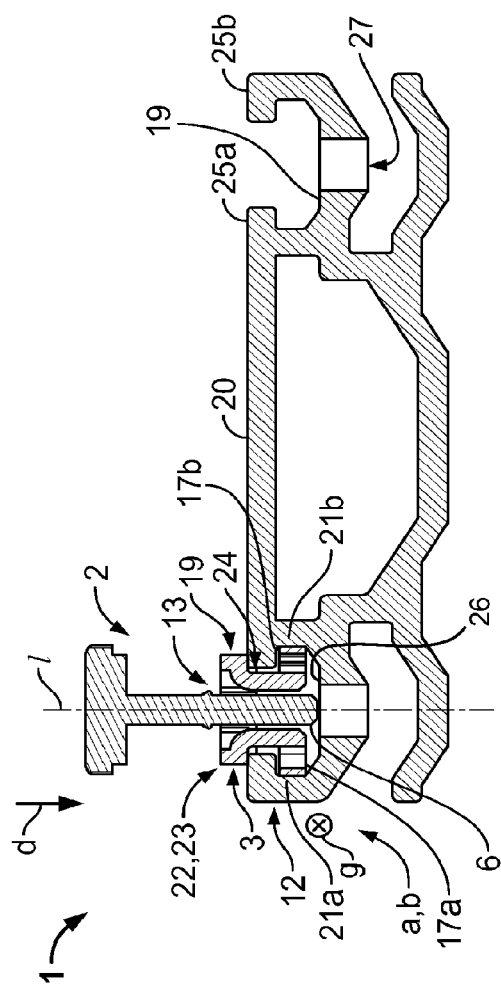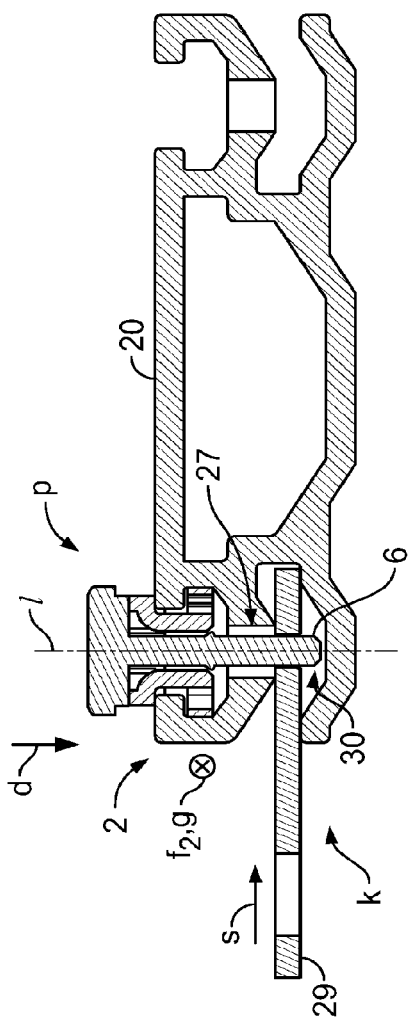

ENGAGEMENT MEMBER WITH FASTENING PIN AND METHOD FOR INTERCONNECTING TWO COMPONENTS

The invention relates to an engagement member that comprises an engagement section that is adapted to be fixed in a groove and to assume an adjustment position, in which the engagement member is movable along the groove and a fixation position, in which the engagement member is fixed to the groove, the engagement member further comprising a neck section which is of a smaller width than the engagement section. Furthermore, the invention relates to a method for interconnecting two components via an engagement member, the method comprising the step of inserting the engagement member at least section-wise into a groove of one component and moving the engagement member relative to the groove for fixing its position.

Engagement members, e.g. for connecting two components to each other, are known in the art. For instance, an engagement member which comprises eyelets for affixing cables via zipties is known. This engagement member can be clamped into the groove with a U- or T-shaped cross-section of e.g. a profiled support beam of a cable management cabinet. For clamping the engagement member, it can be inserted into the groove perpendicular to the longitudinal direction of the groove. After that, the engagement member is typically rotated around an axis that extends perpendicular to the longitudinal axis, e.g. by 90°, for fixing its position in the groove.

In order to connect components to each other in a more stable way, zipties are insufficient. Thus, screws are often used, if e.g. a supporting element, like the abovementioned profiled support beam, is to be connected to another supporting element or to e.g. components of a casing.

The abovementioned holding members generate a holding force, which serves for affixing the holding member itself to the component as well as for interconnecting two components. Thus, forces for mounting the known engagement members to the components have to be so high that the resulting holding force suffices for affixing the engagement member and for providing an interconnection force for the two components. For generating mounting forces, a tool like a screwdriver or an Allen key has to be used. Yet, a proper tool is not always at hand when interconnecting the components. Furthermore, the holding forces may be effected due to loads caused by e.g. the width of the components.

In view of these disadvantages of the known engagement members, an object underlying the invention is to provide engagement members that can more easily be mounted whilst still providing sufficient interconnection forces.

The object is achieved according to the invention for the engagement member in that the engagement member comprises a fastening pin that is held slidably with respect to the engagement section in a fastening direction pointing from the neck section towards the engagement section. For the method, the object is achieved according to the invention in that the method further comprises a step of pushing a fastening pin of the fixed engagement member into a cavity of the other component, thereby blocking a movement of the two components relative to each other.

With an engagement member according to the invention, holding forces and interconnection forces are separated from each other and directed in two different directions. Hence, forces seeking to influence the interconnection of the two components via the engagement member, which are caused by e.g. the weight of at least one of the components, do at least not fully influence the mounting stability of the engagement member. Especially, if the interconnection forces and the holding forces are separated and e.g. directed perpendicular to each other, the effect on the mounting stability is minimized. Hence, loads acting onto the fastening pin caused by the components may seek to deform the pin instead of removing it from the fastening position.

Moreover, via the fastening pin, the components can be interconnected by a form-fit. For instance, the engagement member can be affixed to one component by clamping it to a groove of the component. The holding or clamping force may be directed towards walls of the groove—hence, perpendicular to its longitudinal direction. The ground of the groove may comprise an interconnection pipe that runs transverse to the longitudinal direction and between the groove and a slot, in which the other component can be inserted at least section-wise. If an interconnection section of the other component, which may be inserted into the slot, comprises an interconnection cavity, the fastening pin can be pushed along the fastening direction and through the interconnection pipe into the interconnection cavity. If the fastening direction extends parallel to the interconnection pipe, interconnection forces acting onto the fastening pin are directed perpendicular to the fastening direction. Even if the fastening pin may deform due to loads caused by at least one component, the acting interconnection forces cannot influence the position of the fastening pin in the fastening direction.

By sliding the fastening pin in the fastening direction into the fastening position, the form-fit can be created between the fastening pin and each of the two components and the relative movement of the two components can be blocked. When the fastening pin is removed from the fastening position, the form-fit can be disengaged and the two components can be removed relative to each other.

The solutions according to the invention can be combined as desired and further improved by the further following embodiments that are in each case advantageous on their own.

According to a first possible embodiment, the fixation position can be arranged at a rotational distance from the adjustment position. In the adjustment position, the engagement section can be placed in the groove with some play, such that it may easily be movable along the groove. The rotational distance may be between 45° and 135°, between 70° and 110° and in particular, 90°. A corresponding rotational axis may extend into the groove, i.e. perpendicular to the longitudinal axis of the groove and parallel to the fastening direction. Clamping forces that can be generated by the engagement section in the fixation position, may act perpendicular to the longitudinal direction and onto sidewalls of the groove.

Fixation of the engagement member in the groove can thus be accomplished by a rotation around the rotational axis; the interconnection between the two components can be established by a transfer of the fastening pin along the rotational axis and into the fastening direction.

The engagement section may have a length, measured along the groove in the adjustment position that is greater than the width of the engagement section measured perpendicular to the length. Such an engagement section can be inserted into an undercut groove and can be secured against removal from the undercut groove in the fixation position by overlapping with the undercut against the fixation direction.

In another possible embodiment, the fastening pin may in the fastening position protrude from the engagement section in the fastening direction. The protruding fastening pin may project through the interconnection pipe or any other through-hole in the bottom of the groove, which may serve as guidance for the engagement member.

The fastening pin may assume an adjustment position that can be arranged before the fastening position in the fastening direction. In the adjustment position, the fastening pin may not loom into the bottom of the groove and may end at a distance to the bottom. Thus, in the adjustment position, a movement of the engagement member along the groove is not blocked by the fastening pin.

Furthermore, the fastening pin may assume a pre-assembly position that may be arranged between the fastening position and the adjustment position. In the pre-assembly position, the fastening pin may protrude from the engagement section in the fastening direction. Yet, it may protrude only so far, that the engagement section can be moved along the groove. If arranged on a flat surface of the bottom an engagement end of the fastening pin may abut and be slid on the bottom. While sliding the engagement member along the groove, the engagement end may be caught by the through-hole, indicating a correct interconnection position of the engagement member above the hole.

In a further possible embodiment, the engagement section may be provided by a mounting carrier, in which the fastening pin is at least section-wise slidably received. Providing the engagement section by a mounting carrier results in a more stable and compact engagement member as the mounting carrier fulfils both, a clamping function, fixing the engagement member in the groove, as well as a guidance function, guiding the fastening pin along the fastening direction. For guiding the fastening pin, a guidance slot or channel may be provided in the mounting carrier.

Against the fastening direction, an end of the fastening pin that may project from the mounting carrier against the fastening direction may be used as a handle for moving the engagement member. This end or manipulation end may, for instance, be gripped by the user for sliding the engagement member along the groove, thereby possibly pressing the fastening pin into the pre-assembly position.

If the fastening pin shall also be used for transferring the engagement section from the adjustment position to the fixation position, the fastening pin and the engagement section can be connected to each other in a torque-proof manner. Therefore, the guidance slot or channel may be formed as a key hole and the fastening pin at least sectionwise as a key bit for the key hole. For introducing the necessary mounting torque into the fastening pin, its manipulation end may comprise a manipulation head. The manipulation head may be affixed to the fastening pin and e.g. be single-pieced with the fastening pin. The manipulation head may be shaped for being turned by hand and without any tools and may be shaped as a knob.

In order to define the fastening position and to prevent that the fastening pin is inadvertently removed from the fastening position against the fastening direction, the fastening pin may comprise at least one locking element that, in the fastening position, can be engaged to the mounting carrier. The mounting carrier may be shaped with a counter-locking element that may engage with the fastening pin.

The fastening pin may preferably be shaped with at least two locking elements arranged symmetrically, e.g. on opposite sidewalls of the fastening pin. The sidewalls of the fastening pin may essentially extend along the fastening direction and point away from each other. By such a symmetrical arrangement, the fastening pin may not bend to one direction, if forces try to remove the fastening pin from its locked position.

In an advantageous embodiment, the at least one locking element may be shaped as half of a barbed hook, which may rest on a front surface of the mounting carrier in the fastening position, the front surface pointing towards a button of the groove. A locking side of the locking element, which may be in contact with the front face of the mounting carrier, may be tilted towards the fastening direction, thereby enabling a removal of the fastening pin from the fastening position and again a fastening direction.

The at least one locking element may at least partially surround the fastening pin in its circumferential direction that extends perpendicular to a longitudinal axis of the fastening pin and the fastening direction. Such a locking element offers the special advantage of locking the position of the fastening pin in the fastening direction independent of its rotational position in the circumferential direction and with respect to the mounting carrier.

The fastening pin may comprise at least one spring beam, which may be arranged between the manipulation end and the engagement end. The at least one spring beam may extend along the fastening direction. At least the at least one locking element may be arranged on the at least one spring beam, elastically deforming the spring beam upon insertion of the locking element into the guidance slot. When in the fastening position, the spring beam may push the locking element into locking engagement with the mounting carrier. The at least one spring beam may begin at the manipulation end and terminate at the engagement end in the fastening direction.

The fastening pin may comprise two spring beams, that are arranged parallel to each other in the fastening direction and at a distance to each other transverse to the fastening direction. The two fastening pins may be elastically deformable towards each other. At least one locking element may be arranged on sidewalls of the two spring beams, the sidewalls facing away from the fastening pin. Alternatively, the fastening pin may comprise three or more spring beams that extend along the fastening direction, e.g. in a symmetrical arrangement.

Furthermore, the fastening pin may comprise a securing element that prevents an unintentional removal of the fastening pin from the mounting carrier. The securing element may be in a locking engagement with a counter-securing element of the mounting carrier at least when the fastening pin is at least sectionwise inserted into the mounting carrier.

The securing element may be arranged on the at least one spring beam on a sidewall that is opposite the at least one locking element and behind the at least one locking element in the fastening direction. If the fastening pin comprises two or more spring beams, the spring element may be arranged between the spring beams. The spring beams may be affixed to the securing element, such that they are secured against unwanted deformation, e.g. away from each other.

In yet another possible embodiment, the mounting carrier may comprise at least one clamping organ that protrudes from the neck section of the mounting carrier perpendicular to the fastening direction. In the adjustment position, the clamping organ may essentially extend along the groove. After turning the engagement member into the fixation position, the clamping organ may be pressed against at least one wall of the groove. If the wall is a sidewall of the groove, the force introduced into the wall by the clamping organ produces an opposed force introduced into the opposite sidewall of the groove by the engagement section and e.g. by a second clamping organ. The clamping organ may be arranged at a longitudinal end of the neck section, the longitudinal end being the end of the neck section in the fastening direction.

Alternatively, the clamping organ may be pressed between the bottom side and a top side of the groove. In order to create the clamping force, a height along the fastening direction of the clamping organ may increase towards the engagement member. The height may at least section-wise be larger than the height of the groove in the fastening direction.

The clamping force may be dimensioned such that the mounting carrier is secured against unintentional movements, e.g. caused by gravity, but can still be moved by the user along the groove.

The clamping organ may comprise a spring element, that creates a clamping force by its spring force. For instance, the spring element may be a loop spring, which may be formed as closed or as an interrupted loop that may be deformable perpendicular or parallel to the fastening direction.

In a further possible embodiment, the engagement member may comprise a guidance section, the neck section being arranged between the engagement section and the guidance section in the fastening direction. The guidance section may protrude from the neck section in a direction perpendicular to the fastening direction. In particular, if the engagement member is used with an undercut groove, the guidance section may rest on an outer edge of the groove at least in the adjustment position. In this coverage position, it may prevent dust or other pollution from entering the groove. By the edge and the guidance section, the movement of the engagement member along the groove may be guided and the insertion depths of the engagement member into the groove may be limited. The guidance section may be shaped as a bar or a plate that may extend perpendicular to the fastening direction and the longitudinal axis of the groove at least in the adjustment position.

Between the clamping organ and the guiding section, a positioning channel may extend perpendicular to the fastening direction and parallel to the groove. The edge of the groove may be arranged in the positioning channel at least in the adjustment position, further improving the guidance of the engagement member.

In another possible embodiment, the engagement member may comprise a release element that may at least partly be arranged between the neck section and the fastening pin in the fastening direction. The release element may be adapted to easily remove the fastening pin out of a fastening position in the fastening direction, especially if no tool is available and the engagement member has to be manually operated. The release element may be provided instead of the manipulation head and may be connected to the fastening pin such that a selected movement of the release element removes the fastening pin from the fastening position. Alternatively, the release element and the manipulation head can be provided at the same time and can cooperate in removing the fastening pin.

In the release position, the fastening pin may at least partially be retracted into the mounting carrier with respect to its fastening position. Hence, the fastening pin may be in the pre-assembly position or in the adjustment position when the release element is in the release position.

In order to further simplify the handling of the engagement member, the selected movement of the release element may be a rotation about a rotational axis. Hence, the release element may be adapted to be rotated about the rotational axis with respect to the neck section from a locked position into the release position. The rotational axis may extend along the fastening direction. The fastening pin may in the release position be arranged spaced apart against the fastening direction from its fastening position.

A rotational movement of the release element that guides the longitudinal movement of the fastening pin along the fastening direction may reduce the force needed for the removal of the fastening pin. On the one hand, a diameter of the release element which acts as a lever for rotating the release element, may be large enough in order to easily remove the fastening pin. On the other hand, a connection between the release element and the fastening pin may be realized as a gear, which transfers the rotational movement of the release element into a translational movement of the fastening pin against the fastening direction, additionally reducing the force needed to remove the fastening pin. For instance, the fastening pin may comprise a threaded spindle section, on which the release element is mounted. Flanks of the thread may, however, also be provided on the release element. At least a flank pointing away from the engagement section, the flank being tilted with respect to the fastening direction may be arranged on the release element and in particular on a front face of the release element. A reference surface of the fastening pin and for instance, of the manipulation head may rest on the flank in the fastening direction.

Alternatively, the mounting carrier may be shaped with the at least one flank in the form of a release face. The release element may, at least section-wise, rest on the release face and may immovably be connected to the fastening pin at least against the fastening direction in the fastening position.

The release element may comprise a sleeve-like form with a centre through-hole through which the fastening pin may protrude. The manipulation head may at least in the fastening position be placed in the sleeve and rest on a ground of the sleeve that confines the centre hole. By rotating the release element, it may slide on the release face and move against the fastening direction, thereby pressing the fastening pin against the fastening direction. The mounting carrier may comprise a collar section, which extends against the fastening direction and on whose front face the at least one release face is arranged.

The height of the manipulation head and the depth of the sleeve-shaped release element in the fastening direction may be so measured that the manipulation head can be completely absorbed into the sleeve. If the fastening pin is not in the fastening position and the release element is in the locked position, the manipulation head may project from the release element, indicating that the two components are not correctly interconnected.

Furthermore, the mounting carrier may comprise at least one stop surface for the release element, the stop surface extending against the fastening direction. In the fastening direction, a base of the stop surface may be arranged, from which the at least one release surface may extend in a circumferential direction of the mounting carrier and for instance, in clockwise direction. Hence, the stop surface points clockwise. A clockwise rotation of the release element from the locked position into the release position may remove the fastening pin from the fastening position. If the release element is in the locked position and further rotated counter-clockwise, the resulting torque may rotate the mounting carrier from the fixation position into the adjustment position or vice versa. It goes without saying, that in an alternative embodiment, the stop surface may point counter-clockwise.

Possible implementations of the invention will be described hereinafter in greater detail and in an exemplary manner using the advantageous embodiments and with reference to the drawings. The described embodiments are only configurations in which, however, the individual features as described above can be provided independently of one another or can be omitted in the drawings:

FIG. 3 is a cross-sectional frontal view of the exemplary embodiment of FIGS. 1 and 2 of the engagement member inserted into a groove of a component to be connected;

FIG. 4 is a cross-sectional frontal view of the exemplary embodiment of FIG. 3, in which a second component is interconnected to the component by the fastening pin;

Figure 1:
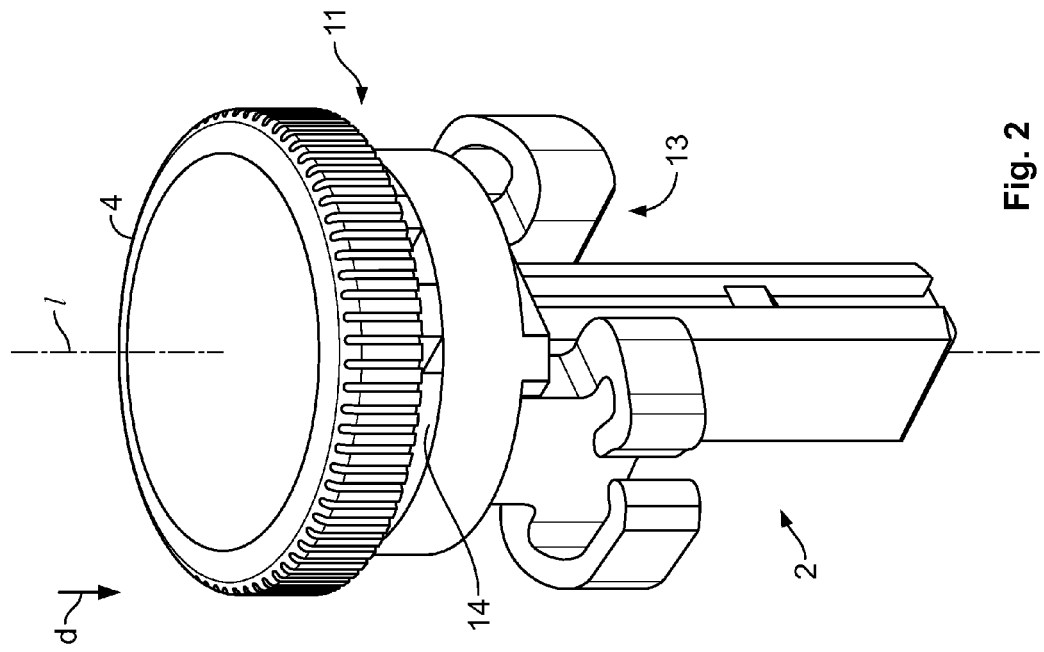
FIG. 1 is a schematic perspective view of a first exemplary embodiment of a fastening pin and a mounting carrier of the engagement member according to the invention.

First, an engagement member 1 will be described with reference to FIG. 1. The engagement member 1 is shown with a fastening pin 2 and a mounting carrier 3. The fastening pin 2 and the mounting carrier 3 may be arranged at a distance to each other in a fastening direction d and arranged along a longitudinal axis l of the fastening pin 2. The longitudinal axis l and the fastening direction d can extend parallel to each other.

The fastening pin 2 can essentially extend along its longitudinal axis l and may be provided with a manipulation head 4 at its manipulation end 5 that extends against the fastening direction d. In the fastening direction d and opposite of its manipulation end 5, the fastening pin 2 can comprise an engagement end 6. Between the manipulation end 5 and the engagement end 6, the fastening pin 2 may essentially extend along the fastening direction d. A locking element 7 can be arranged on a middle section of the fastening pin 2 and may protrude from the middle section 8 perpendicular to the longitudinal axis l.

In some embodiments, the fastening pin 2 may comprise a structure that is elastically perpendicular to the longitudinal axis l. For instance, the fastening pin 2 may comprise two spring beams 9a, 9b, that extend between the manipulation end 5 and the engagement end 6. At least the spring beam 9a on which the locking element 7 may be arranged, may generate a locking force for the locking element 7. Alternatively, or additionally, also the spring beam 9b may be provided with a locking element 7, each locking element 7 pointing away from the fastening pin 2. The two spring beams 9a, 9b may be interconnected by a securing element 10 which may be affixed to the spring beams 9a, 9b. The securing element 10 may be arranged behind the at least one locking element 7 in the fastening direction d.

In some embodiments, the fastening pin 2 may comprise an essentially cylindrical shape between the manipulation end 5 and the engagement end 6. For instance, the fastening pin 2 may have a rectangular or circular cylindrical shape and may be designed as a key bit or a manipulation sword.

The manipulation head 4 may have a diameter r transverse to the longitudinal direction 1, which is larger than the remaining fastening pin 2 in the same direction. The manipulation head 4 may be rigidly connected to the remaining parts of the fastening pin 2 or may be formed as an integral part of the fastening pin 2. The manipulation head 4 may be adapted for gripping and manipulating the position of the fastening pin 2 by hand.

The mounting carrier 3 may in some embodiments be provided with a neck section 11 and an engagement section 12. The neck section 11 may be arranged before the engagement section 12 in the fastening direction d.

The neck section 11 may comprise a guidance channel 13, which may extend along the fastening direction d completely through the mounting carrier 3. The guidance channel 13 may be adapted in order to receive and guide the fastening pin 2 in the fastening direction d and may be designated as a key hole or a sheath. The manipulation head 4 may rest on a front face 14 of the neck section 11, if the fastening pin 2 is completely inserted into the guidance channel 13. The front face 14 may point against the fastening direction d.

Sidewalls 15 of the guidance channel 13 which may point towards the longitudinal axis 1 may comprise at least one counter securing element 16.

If the fastening pin 2 is at least section-wise inserted into the mounting carrier 3, it may be connected to the mounting carrier 3 in a torque-proof manner. Hence, the fastening pin 2 cannot be rotated around the longitudinal axis l and relative to the mounting carrier 3 if it is at least partially inserted into the guidance channel 13. In order to connect the fastening pin 2 and the mounting carrier 3 in the torque-proof manner, the spring beams 9a, 9b may flank the at least one counter securing element 16 perpendicular to the longitudinal axis l. The spring beams 9a, 9b may rest on the at least one counter securing element 16 or may be arranged at a distance to the at least one counter securing element 16, resulting in a play which may make insertion and removal of the fastening pin 2 into or from the guidance channel 13 easier.

The engagement section 12, which may be arranged behind the neck section 11 in the fastening direction d, may comprise at least one clamping organ 17a. In some embodiments, the engagement section 12 may comprise more than one clamping organ 17a, for instance, a second clamping organ 17b and the at least two clamping organs 17a, 17b may be symmetrically arranged around the longitudinal axis l. For instance, the two clamping organs 17a, 17b may be arranged on opposite sides of the engagement section 12.

Each clamping organ 17a, 17b may be elastically deformable. In some embodiments, the at least one clamping organ 17a, 17b may be elastically deformable parallel to the longitudinal axis l. In other embodiments, the at least one clamping organ 17a, 17b may be elastically deformable perpendicular to the longitudinal axis l. The at least one clamping organ 17a, 17b may protrude the neck section 11 perpendicular to and may extend away from the longitudinal axis l. The guidance channel 13 may extend next to and beyond the at least one clamping organ 17a, 17b.

For instance, the at least one clamping organ 17a may be formed as a loop spring, a closed loop spring or an interrupted loop spring. The interrupted loop spring may comprise at least two spring claws 18a, 18b, whose free ends may be spaced apart from each other in a non-deformed state of the at least one clamping organ 17a, 17b. If the at least one clamping organ 17a, 17b is deformed towards the longitudinal axis, the free ends of the spring claws 18a, 18b may be brought into mechanical contact with each other, enhancing a spring or engagement force f1 that may be directed away from the longitudinal axis l.

Figure 2:
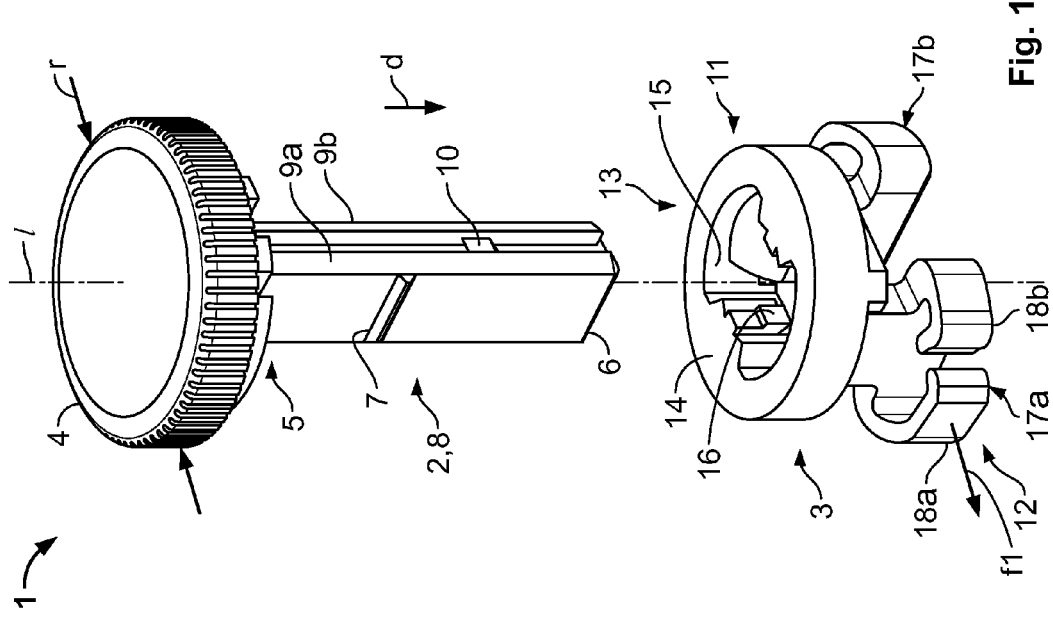
FIG. 2 is a schematic perspective view of the exemplary embodiment of FIG. 1 with the fastening pin and the mounting carrier assembled.

FIG. 2 shows the exemplary embodiment of the engagement member 1 according to FIG. 1.

The fastening pin 2 is shown in a fastening position p, in which it is completely inserted into the guidance channel 13, such that the manipulation head 4 rests on the front face 14 of the neck section 11. The fastening pin 2 may be secured in the fastening position p against the fastening direction d by the locking element 7, which engages behind the neck section 11 adjacent to the guidance channel 13.

FIG. 3 shows the engagement member 1 according to the exemplary embodiment of FIG. 1, but inserted into a groove 19 of a component 20. The component 20 is to be connected to a further component and may be a profiled support beam of e.g. a cable cabinet.

The engagement section 12 of the mounting carrier 3 is inserted to and clamped inside the groove 19. The groove 19 may be an undercut groove.

In some embodiments, the fastening pin 2 may assume an adjustment position a, in which it may be only partly inserted into the guidance channel 13 in the fastening direction d. In the adjustment position a, the engagement end 6 may protrude from the mounting carrier 3 in the fastening direction d so far, that it is arranged in the groove 19.

The engagement member 1 may assume a fixation position b, in which it is clamped in the groove 19. In the fixation position b, the at least one clamping organ 17a, 17b may press with the mounting force f1 against a wall of the groove 19. The wall may be a sidewall 21a, 21b of the groove 19. Alternatively, the at least one clamping organ 17a, 17b may direct the mounting or engagement force f1 onto ground or top walls of the groove 19, the ground wall facing against and the top wall facing in the fastening direction d.

The groove 19 may extend along a groove direction g that may extend perpendicular to the longitudinal axis l of the fastening pin 2.

The mounting carrier 3 may be rotated about the longitudinal axis l from the fixation position b to the adjustment position a. In the adjustment position a, the mounting carrier 3 can be inserted or removed to or from the groove 19 and can be moved along the groove 19.

A top section 22 of the neck section 11 may comprise a guidance section 23. The guidance section 23 can be arranged at a distance to the engagement section 12 against the fastening direction d and may extend away from the longitudinal axis l. Between the guidance section 23 and the engagement section 12 a positioning channel 24 may be arranged, in which top walls 25a, 25b of the groove 19 may be arranged. The top walls 25a, 25b delimit the groove 19 against the fastening direction d. The guidance section 23 may rest on the top walls 25a, 25b.

In the adjustment position a, the engagement end 6 may be arranged at a distance to a bottom 26 of the groove 19. Alternatively, it may rest on the bottom 26 in the fastening direction d. If the fastening pin 2 is arranged before an interconnection pipe 27 of the component 20, it may be arranged before the pipe 27 in the fastening direction d.

FIG. 4 shows the exemplary embodiment of FIG. 3, in which the fastening pin 2 is arranged in the fastening position p along the fastening direction d. In the fastening position p, the engagement end 6 of the fastening pin 2 may be arranged beyond the interconnection pipe 27. The fastening pin 2 can extend through the interconnection pipe 27 and the engagement end 6 may be arranged beyond the interconnection pipe 27 protruding into an interconnection slot 28 of the component 20. The interconnection slot 28 may at least section-wise extend in a slot direction s, which may extend perpendicular to the longitudinal axis l and parallel to the groove 19. The interconnection pipe 27 may extend along the longitudinal axis l and parallel to the groove 19. A further component 29 is shown inserted in the interconnection slot 28 in the slot direction s. The engagement end 6 may at least section-wise project into an interconnection cavity 30 of the further component 29, the interconnection cavity 30 being in axial alignment with the interconnection pipe 27 when the further component 29 is inserted into the interconnection slot 28.

The fastening pin 2, that can be affixed in the fastening direction d and the groove direction g and which may extend through the interconnection pipe 27 and into the interconnection cavity 30, may interconnect the components 20, 29 by a form-fit k. Forces that may seek to remove the further component 29 out of the interconnection slot 28 act perpendicular to the longitudinal axis l of the fastening pin 2—hence, perpendicular to the fastening direction d. Forces parallel to the slot direction s may not result in a movement of the fastening pin 2 in or against the fastening direction d. For instance, a gravitational load f2 caused by the further component 29, may act onto the fastening pin 2 in the groove direction. Hence, the connection between the components 20, 29 is secured by the fastening pin 2 except if forces that seek to remove the further component 29 out of the interconnection slot 28 lead to damage or destruction of the fastening pin 2.

Figure 5:
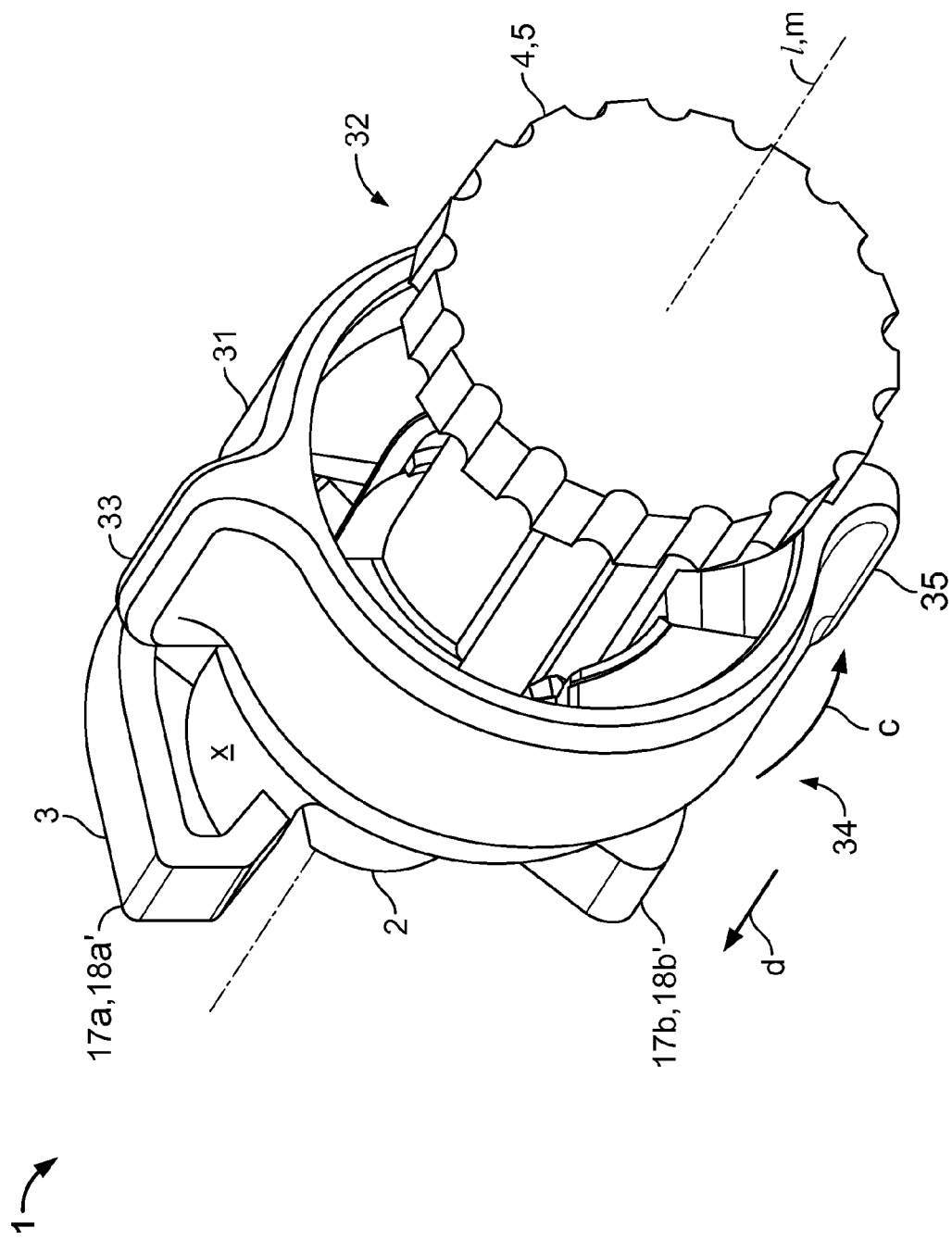
FIG. 5 is a schematic perspective view of a second exemplary embodiment of the engagement member.

FIG. 5 shows another exemplary embodiment of the engagement member in a schematic perspective view with a release element 31. Same reference signs are being used for elements, which correspond in function and/or structure to the embodiments of FIGS. 1-4. For the sake of brevity, only the differences from the exemplary embodiments of FIGS. 1-4 will looked at.

The release element 31 can be arranged between the mounting carrier 3 and the manipulation end 5 in the fastening direction d. The fastening pin 2 can extend through the release element 31 in the fastening direction d, the release element 31 may be comprising a central through hole 32 for the fastening pin 2. Transverse to the fastening direction d, a size of the central through hole 32 may be of a smaller dimension than the diameter r of the manipulation end 4. The release element 31 may be shaped as a sleeve or a pot, which can be adapted to receive the manipulation head 4 at least sectionwise or even completely in the fastening direction d.

The release element 31 may comprise at least one and in some embodiments at least two gripping protrusions 33 that protrude from a ring-shaped section 34 of the release element 31. The at least one gripping protrusion 33 may provide for a gripping surface 35 for manually turning the release element 31 in a circumferential direction c of the engagement member 1 around the longitudinal axis l. Turning the release element 31 may result in a rotation of the release element 31 around a rotational axis m, which may be in alignment with the longitudinal axis l.

In some embodiments, the clamping organs 17a, 17b can be shaped as closed spring loops 18'a, 18'b, which may extend transverse to the fastening direction d and away from each other. The closed spring loops may begin and end at the engagement section x and span continuously between their start and end in a plane, on which the fastening direction d stands vertically.

Figure 6:
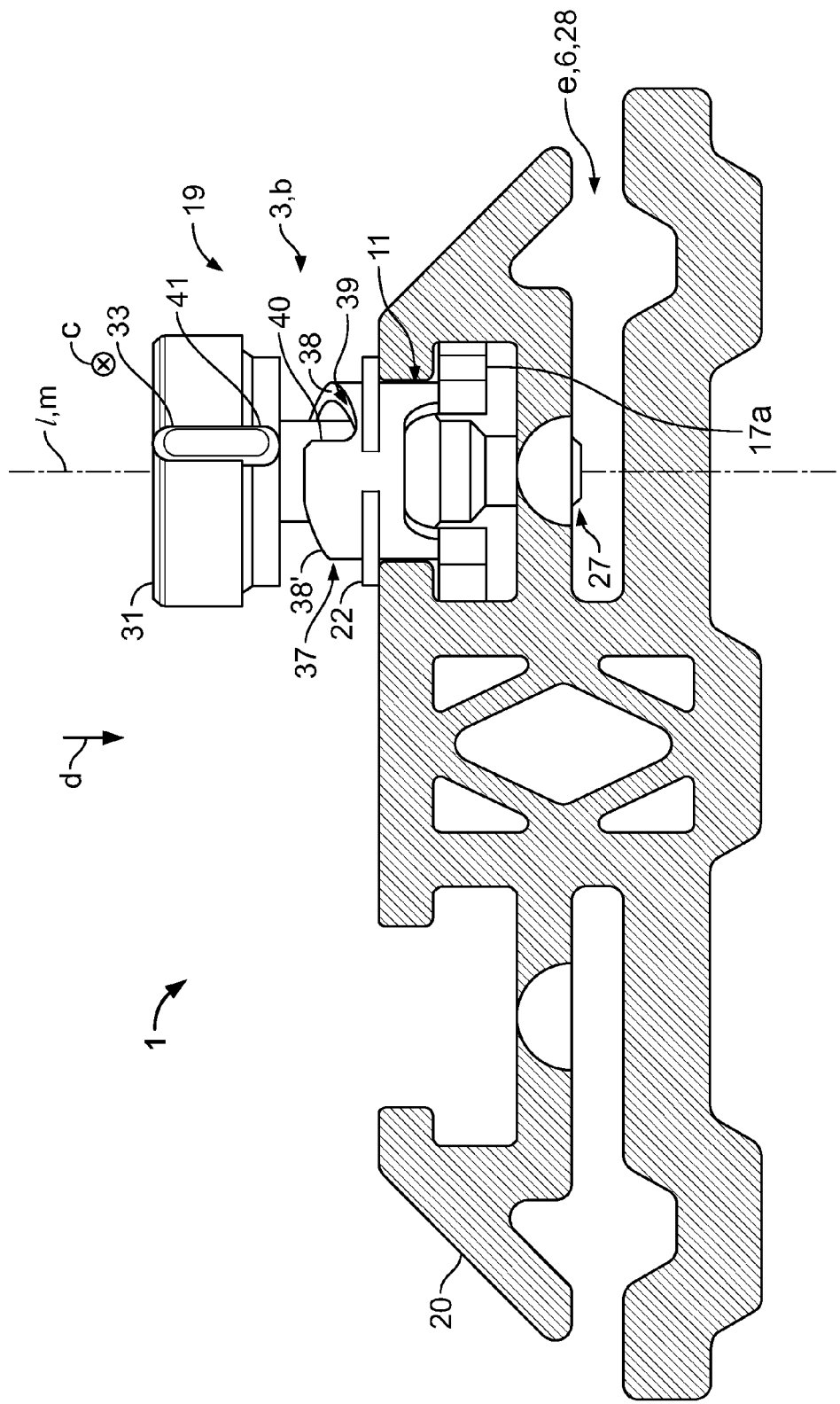
FIG. 6 is a schematic frontal view of the exemplary embodiment of the engagement member of FIG. 5 inserted into a groove of a component.

FIG. 6 shows the engagement member 1 according to the exemplary embodiment of FIG. 5, but inserted into the groove 19 of the component 20. The component 20 is yet not connected to the further component 29. The arrangement of the engagement member 1 in the groove 19 essentially corresponds to the arrangement shown in FIG. 3. Same reference signs are being used for elements, which correspond in function and/or structure to the embodiment of FIGS. 3 and 5. For the sake of brevity, only the differences from the exemplary embodiments of FIGS. 3 and 5 will be looked at.

In comparison to the arrangement of the engagement member 1 as shown in FIG. 3, the engagement member 1 in FIG. 6 is arranged in a pre-assembly position e. In the per-assembly position e, the engagement end 6 of the engagement member 1 may be arranged adjacent to the interconnected pipe 27 in the fastening direction d or be pushed further at least into the interconnection pipe 27 in the fastening direction d. Furthermore, the engagement end 6 may protrude from the interconnection pipe 27, such that the further component 29 can still be inserted into the interconnection slot 28.

In the displayed frontal view, further possible features of the mounting carrier 3 are shown. Before the guidance section 22 in the fastening direction d, the mounting carrier 3 may comprise a manipulation section 37. The manipulation section 37 may be of a hollow cylindrical shape, e.g. as a collar.

The manipulation section 37 may comprise at least one release surface 38, which may extend along the circumferential direction c and against the fastening direction d at least sectionwise around the longitudinal axis l. In some embodiments, the manipulation section 37 may comprise at least a second release surface 38'. Two release surfaces 38, 38' may circle the longitudinal axis l in a double helix form. The at least one release surface 38 may start at a base 39 and extend from this base 39 against the fastening direction d. From the base 37, a stop surface 40 of the manipulation section 39 may extend against the fastening direction d.

The release element 31 may at least sectionwise rest on the at least one release surface 38 at least in the fastening position p. If rotated in the circumferential direction c, the release element 31 may at least sectionwise slide on the at least one release surface 38 and may be pushed by the release surface 38 against the fastening direction d, dragging the fastening pin 2 against the fastening direction p. The circumferential direction c may be counter clockwise when viewed in the fastening direction d.

In some embodiments, the mounting carrier 3 may be rotated into or out of the fixation position b by pushing the release element 31 against the stop surface 40. For instance, the gripping protrusion 33 may comprise a manipulation end 41. The manipulation end 41 may protrude from the release element 31 in and transverse to the fastening direction d. It may be adapted to slide on the at least one release surface 38 and be pushed against the stop surface 40.

Figure 7:
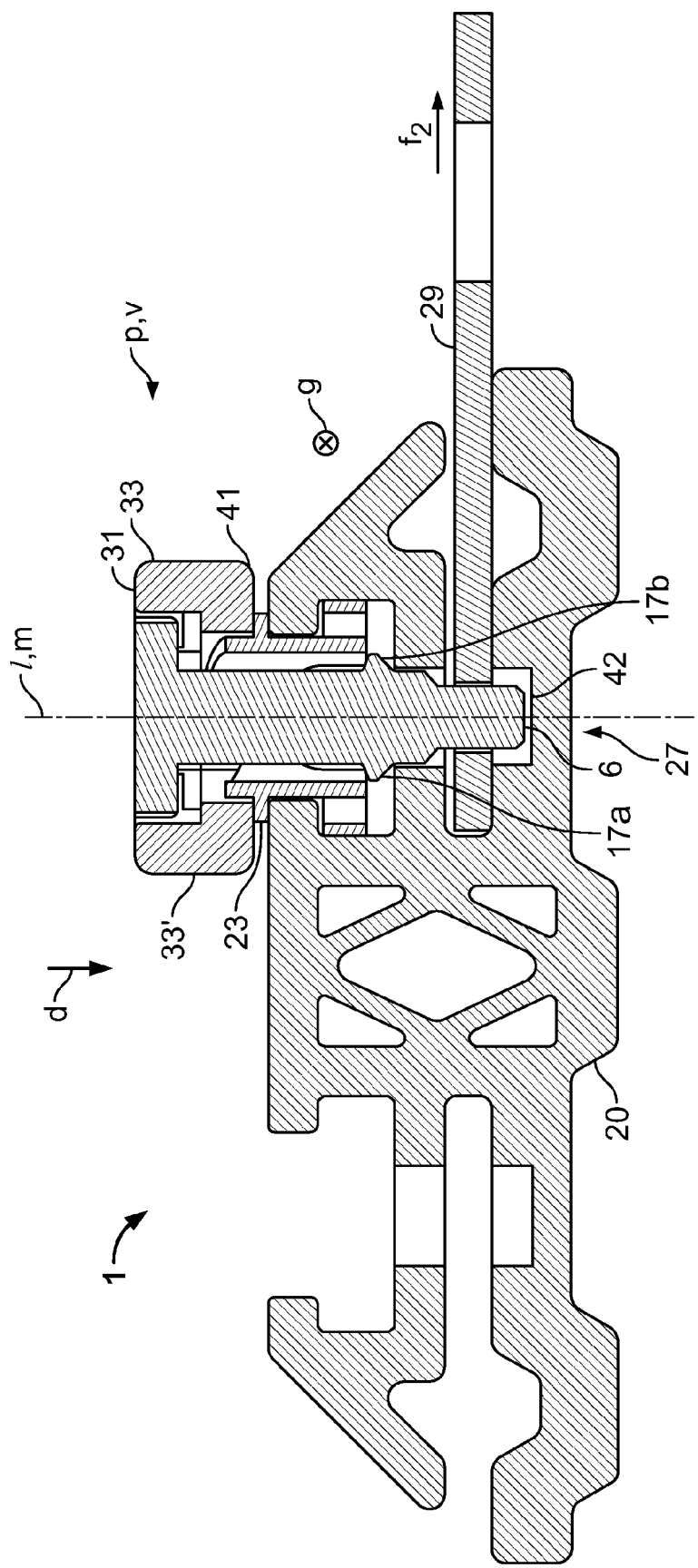
FIG. 7 is a schematic cross-sectional view of the exemplary embodiment of FIGS. 5 and 6, in which a second component is interconnected to the component via the fastening pin.

FIG. 7 shows the exemplary embodiments of FIGS. 5 and 6. The arrangement of FIG. 7 resembles the arrangement of the engagement member 1 in FIG. 4. Same reference signs are being used for elements, which correspond in function and/or structure to the embodiments of FIGS. 4-6. For the sake of brevity, only the differences from the exemplary embodiments of FIGS. 4-6 will looked at.

In FIG. 7, the engagement member 1 is shown in the fastening position p. The engagement end 6 is located in the fastening direction d beyond the further component 29, through which it projects into a cavity 42, which may be aligned with the interconnection pipe 27. The clamping organs 17a, 17b may be in a locking engagement with the mounting carrier 3 and be arranged behind the mounting carrier 3 in the fastening direction d, overlapping the mounting carrier 3.

The release element 31 may comprise two gripping protrusions 33, which may be arranged in a plane perpendicular to the groove direction g in the fastening position p. In a locked position v, the release element 31 may in the fastening direction d rest on the guidance section 23 of the mounting carrier 3.

Figure 8:
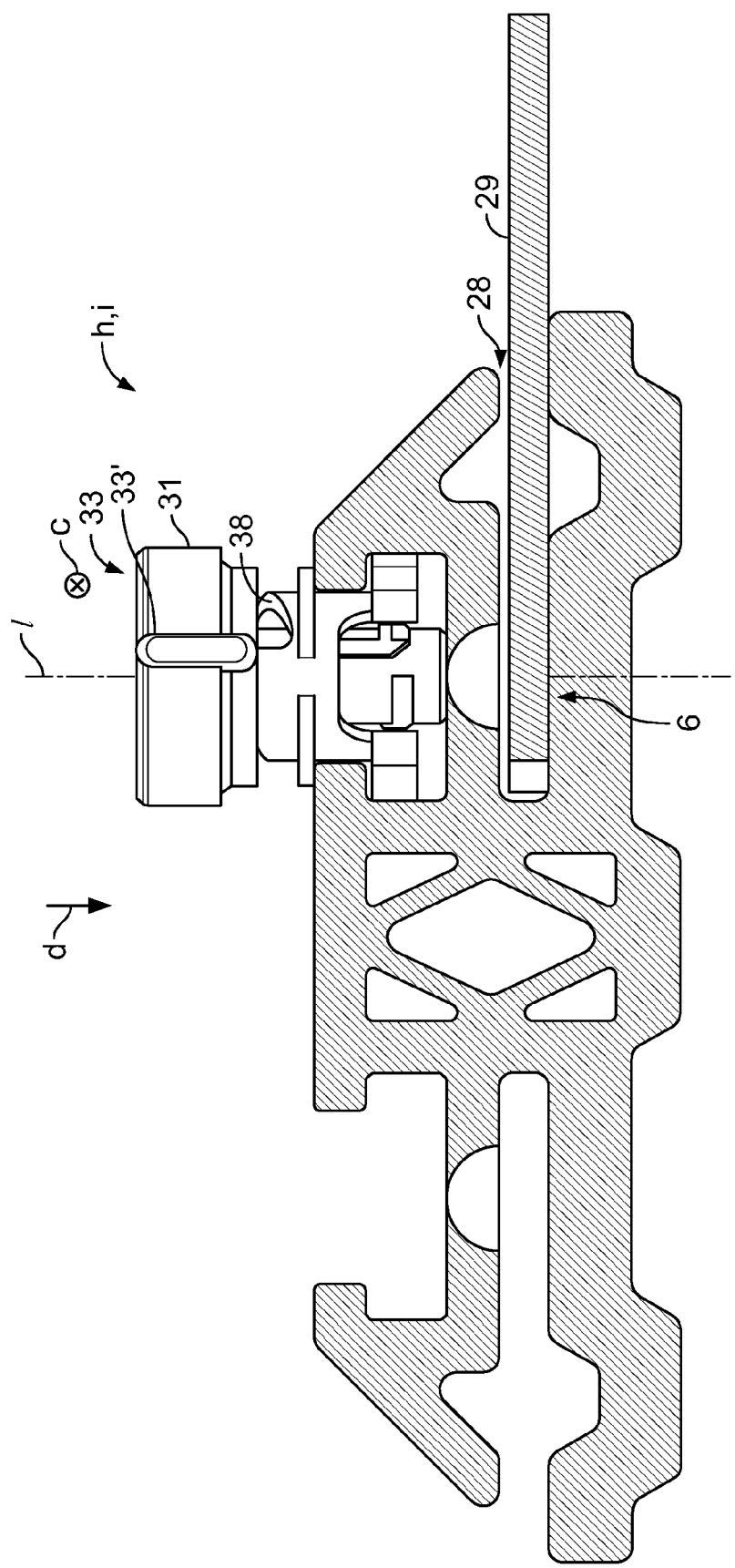
FIG. 8 is a schematic frontal view of the engagement member according to the exemplary embodiment of FIG. 5 inserted into the groove and in a release position.

FIG. 8 shows an exemplary embodiment of FIGS. 6 and 7, the engagement member being shown in a release position h.

Compared to the locked position v, the gripping protrusions 33, 33' may in a release position i be rotated around the rotational axis m in the circumferential direction c, whereby the release element 31 may slide on the at least one release surface 31. By turning the release element 31, the fastening pin 2 can be pulled out of the fastening position p against the fastening direction d. In some embodiments, the engagement end 6 may be retracted against the fastening direction d at least out of the interconnection slot 21. Due to the translational movement of the fastening pin 2 against the fastening direction d, which may be caused by the rotational movement of the release element 31, the form-fit between the engagement end 6 and the further component 29 may be disengaged, such that the further component 29 may be removed from the interconnection slot 28.

The invention claimed is:

1. An engagement member comprising:
   an engagement section that is adapted to be affixed in a groove, the engagement section having an adjustment position such that the engagement member is movable along the groove and a fixation position such that the engagement member is affixed to the groove, the engagement member being adapted to be turned from the adjustment position to the fixation position, wherein the adjustment position and the fixation position have a rotational distance to each other,
   a neck section having a smaller width than the engagement section perpendicular to a fastening direction pointing from the neck section towards the engagement section, the neck section including a guidance channel extending along the fastening direction, the guidance channel including inner sidewalls having at least one counter securing element extending outwardly from the inner sidewalls and into the guidance channel, the engagement section being adapted to generate clamping forces that act perpendicularly to the fastening direction,
   a fastening pin including two spring beams, the two spring beams each having a locking element on an outer surface thereof pointing away from the fastening pin, and the two spring beams being interconnected by a securing element affixed to the two spring beams, wherein the fastening pin in a fastening position protrudes from the engagement section in the fastening direction, the fastening pin having a non-circular outer profile that mates with a non-circular inner profile of an inner passage of the engagement section in a torque proof manner such that the two spring beams flank the at least one counter securing element perpendicular to the fastening direction, wherein the engagement section is adapted to be turned in the groove from the adjustment position to the fixation position by the fastening pin such that the engagement section and the fastening pin move together to prevent any relative rotation therebetween, wherein the fastening pin is held slidably with respect to the engagement section in the fastening direction, and wherein the engagement section is provided by a mounting carrier, in which the fastening pin is at least sectionwise slidably received, and the locking element is engaged to the mounting carrier while in the fastening position.

2. The engagement member according to claim 1, wherein the locking element at least partially surrounds the fastening pin in its circumferential direction essentially perpendicular to the fastening direction.

3. The engagement member according to claim 1, wherein the mounting carrier comprises at least one clamping organ that protrudes from the engagement section of the mounting carrier perpendicular to the fastening direction.

4. The engagement member according to claim 1, wherein the neck section is in the fastening direction arranged between the engagement section and a guidance section that protrudes from the neck section perpendicular to the fastening direction.

5. The engagement member according to claim 1, wherein the engagement member comprises a release element that is at least partly arranged between the neck section and the fastening pin in the fastening direction.

6. The engagement member according to claim 5, wherein the release element is adapted to be rotated about a rotational axis with respect to the neck section from a locked position into a release position, the rotational axis extending along the fastening direction and the fastening pin in the release position being spaced apart against the fastening direction from its fastening position.

7. The engagement member according to claim 6, wherein in the release position the fastening pin is at least partly retracted into the mounting carrier with respect to its fastening position.

8. The engagement member according to claim 5, wherein the mounting carrier is shaped with at least one release surface that is tilted with respect to the fastening direction and that points away from the engagement section, the release element at least sectionwise resting on the release surface.

9. The engagement member according to claim 5, wherein the mounting carrier comprises at least one stop surface for the release element, the stop surface extending in the fastening direction.

\* \* \* \* \*